G. F. GREEN.
Electro-Magnetic Dental Tool.
No. 159,028.　　　　　　　　　　　　Patented Jan. 26, 1875.
Fig. 1.　　Fig. 3.　　　　　　　　　　Fig. 2.
Fig. 4.
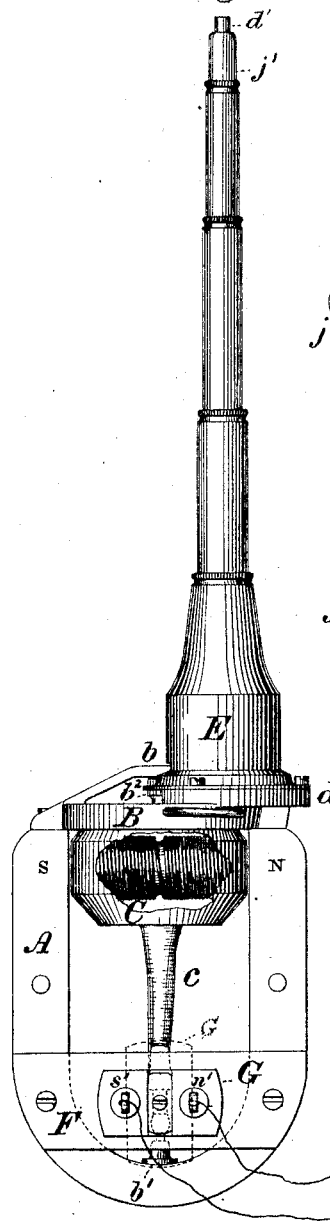
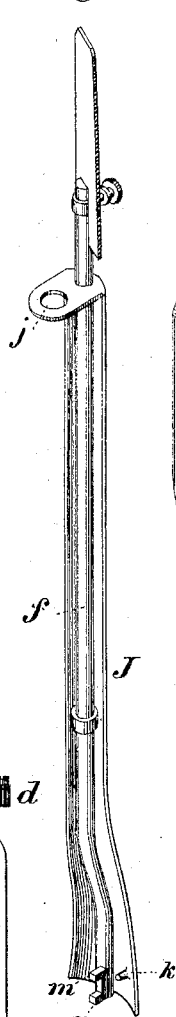
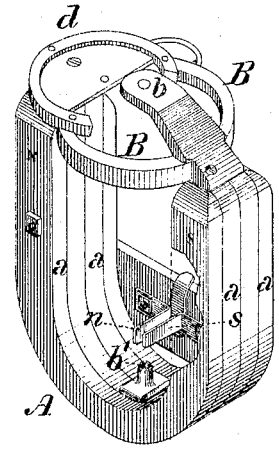
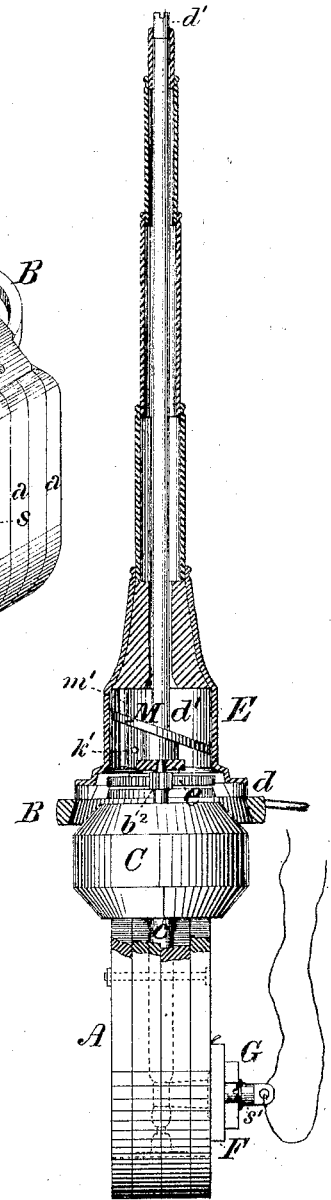
Fig. 5.
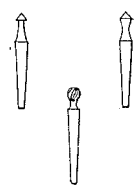
Witnesses.　　　　　　　　　　　　　Inventor.

UNITED STATES PATENT OFFICE.

GEORGE F. GREEN, OF KALAMAZOO, MICHIGAN, ASSIGNOR TO SAMUEL S. WHITE, OF PHILADELPHIA, PENNSYLVANIA.

IMPROVEMENT IN ELECTRO-MAGNETIC DENTAL TOOLS.

Specification forming part of Letters Patent No. 159,028, dated January 26, 1875; application filed January 13, 1871.

*To all whom it may concern:*

Be it known that I, GEORGE F. GREEN, of Kalamazoo, Kalamazoo county, Michigan, have invented a certain new and useful Dental Implement, of which the following is a specification:

My invention relates to implements for sawing, filing, dressing, or polishing teeth, for drilling holes and preparing cavities, and for plugging the same. Its objects are to render dental operations more convenient, more rapid, and less painful than they have heretofore been; to which ends my invention consists in the application, to dental implements, of an electro-magnetic motor, as hereinafter more fully explained.

In the accompanying drawings, Figure 1 represents a view, in elevation, of my improved electro-magnetic engine. Fig. 2 represents a view at right angles to the position shown in Fig. 1, partly in elevation, and partly in section. Fig. 3 represents a filing or polishing apparatus, detached. Fig. 4 shows, in perspective, the permanent magnet and the frame upon which the tool is mounted; and Fig. 5 shows different forms of rotating tools.

A permanent (horseshoe-shaped) magnet, A, composed of bars $a\ a\ a\ a$, has a frame, B, secured across its open end. This frame B affords a bearing, $b$, for one end of a spindle, $c$, the other end of which has a step-bearing, $b'$, in the closed end of the magnet A. Upon this spindle $c$, and between the poles of the magnet A, an electro-magnet, C, is secured, so that it may revolve when the current of electricity is established. Between the top of the magnet C and the bearing $b$ a pinion, $b^3$, is secured upon the spindle, and a base-plate, $d$, upon the frame affords points of attachments for the casing E, as will be presently described. Across the lower part of the permanent magnet A an insulated bar, F, is secured, and through this bar a pole-changer arrangement, G, of well-understood form, is brought into proper relations with the spindle $c$ through the metallic pads N S and eye attachments N' S'.

I thus have a permanent magnet, an electro-magnet, and a pole-changer arrangement combined in a form convenient for handling, and affording the requisite facilities for mounting upon it the instrument to be operated by the motor.

In connection with the pole-changer arrangement I have devised a reversing-switch, whereby the direction of rotation of the electro-magnet, and with it the direction of rotation of the tool, may be reversed. This is effected by making the button G, to which the wires are connected, turn entirely around its center, the revolution of the button thus breaking or establishing the circuit at the quarter-turn, while the half-turn of the button will change the wires and reverse the current.

I apply the power generated by the rotation of the electro-magnet to the instrument by mounting upon the frame B a suitable casing, E, through which I carry a spindle, $d'$, the lower end of which is provided with a bearing on the plate $d$ of the frame B, while its upper end protrudes through the casing, and is socketed for the reception of tools, such as shown in Fig. 5. The spindle carries at its lower end a gear-wheel, $e$, with which the pinion $b^2$ on the magnet-spindle $c$ meshes, and by this simple connection the tool is rotated by the revolution of the electro-magnet. Above this gear-wheel I mount upon the spindle $d'$ an oblique wheel, (or a wheel having a cam-surface to operate in the same way,) M, the purpose of which will be presently described.

As in some cases it is desirable to use instruments which do not rotate, but which have a reciprocating motion, I provide for such changes in the motion of the instrument by substituting for a direct application of the power through the spindle $d'$ a frame, Fig. 3, which consists of a concave piece of metal, J, with its upper end bent over and perforated with a hole, $j$, adapted to it, upon the upper end, $j'$, of the casing E. This piece J is bent so as to conform to the taper of the casing E, and while its upper end is looped over the casing, as described and shown, its lower end fits upon the flanged base of the casing, and is secured in position by means of a pin, $k$, projecting from the inner surface of the piece J, and fitting into a hole, $k'$, Fig. 2, provided for it in the casing. There will be a space between the piece J and the casing E, and also space in the concave of the piece J, sufficient to contain the sliding bar $f$ and permit it to play freely up and down or to and fro. This bar $f$ projects through the loop at the upper end of the piece J, and at its lower end is provided with a pair of lugs, $m\ m$, which project through a vertical slot, $m'$, in the casing, and embrace the edge of the cam-wheel M on the spindle $d'$. The piece J is secured in place, and the lugs kept in their effective position, by means of a lock slide or catch pivoted to the piece J near its base. In the top of the protruding end of the bar $f$ a slot and set-screw are provided, so as to receive and hold a file, a saw, or a burnisher.

With this arrangement the rotation of the electro-magnet drives the spindle $d'$, through the gearing already described, as in the use of a rotating instrument; but the cam-wheel M now acts upon the rod $f$ through the lugs $m\ m$, and moves it, and with it the file, saw, or burnisher, to and fro.

The connection of the wires of the battery with the respective ends of the pole-changer G is well understood, and requires no further description.

It is obvious that the details of construction of the several parts of the apparatus may be varied somewhat without departing from the spirit of my invention. I therefore wish it to be understood that I do not limit myself to the precise construction shown. I believe myself to be the first ever practically and successfully to apply electro-magnetism as the motive power in operative dentistry.

I claim as my invention—

1. The combination, substantially as hereinbefore set forth, of an electro-motor and a dental instrument, upon which it is mounted.

2. The combination, substantially as hereinbefore set forth, in a dental-implement, of a permanent magnet, a rotating electro-magnet, and gearing actuated by the rotating magnet.

3. The combination, substantially as hereinbefore set forth, of a dental instrument with an electro-motor and a reversing-button mounted thereon, for the purposes described.

4. The combination, substantially as hereinbefore set forth, of the magnets, the socketed spindle $d'$, and the casing.

5. The combination, substantially as hereinbefore set forth, with an electro-motor, its driving-gearing, and casing, all mounted on a common frame, of a detachable tool-holder, for the purposes described.

6. The combination, substantially as hereinbefore set forth, of a dental instrument, an electro-motor mounted thereon, and a reciprocating tool-holder.

7. The combination, substantially as hereinbefore set forth, of the horseshoe-magnet, the rotating electro-magnet, and the frame B, for the purposes described.

8. The combination, with the frame of a dental instrument, of the electro-motor, the spindle $d'$, the gear-wheel $e$, and the cam-wheel M, for imparting to the tool either a rotary or a reciprocating motion, substantially as set forth.

In testimony whereof I have hereunto subscribed my name.

GEORGE F. GREEN.

Witnesses:
LEVI TEAL,
WM. E. MORGAN.